No. 729,311. PATENTED MAY 26, 1903.
H. P. FEISTER.
COMPRESSIBLE TIRE FOR VEHICLES.
APPLICATION FILED JUNE 25, 1902.
NO MODEL.

No. 729,311. Patented May 26, 1903.

UNITED STATES PATENT OFFICE.

HENRY P. FEISTER, OF PHILADELPHIA, PENNSYLVANIA.

COMPRESSIBLE TIRE FOR VEHICLES.

SPECIFICATION forming part of Letters Patent No. 729,311, dated May 26, 1903.

Application filed June 25, 1902. Serial No. 113,105. (No model.)

*To all whom it may concern:*

Be it known that I, HENRY P. FEISTER, a citizen of the United States, residing in the city of Philadelphia, State of Pennsylvania, have invented certain new and useful Improvements in Compressible Tires for Vehicles, of which the following is a full, clear, and exact description, reference being had to the accompanying drawings, forming a part of this specification.

My invention relates to compressible tires for vehicles. It has for its object to produce a construction of wheel-tire especially adapted to motor-vehicles and to obtain all the beneficial and useful resiliency created by the well-known rubber pneumatic tire inflated with air and at same time provide a metallic wearing-surface which will give not only increased resistance to wear, but a greater traction effect.

To these ends my invention consists in the combination, with a suitable wheel-center, of an inner compressible tire operating as a cushion and an exterior metallic tire having undulating interior and exterior surfaces longitudinally with means between the coinciding elements to maintain them laterally in register, also in the particular construction of the compressible tire-cushion, in the particular construction of the exterior metallic tire, and in other detail features of construction hereinafter described.

Figure 1:
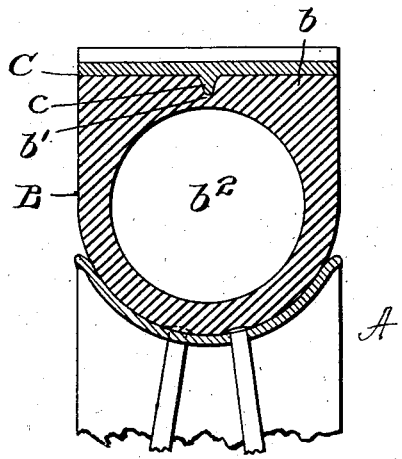
Figure 2:
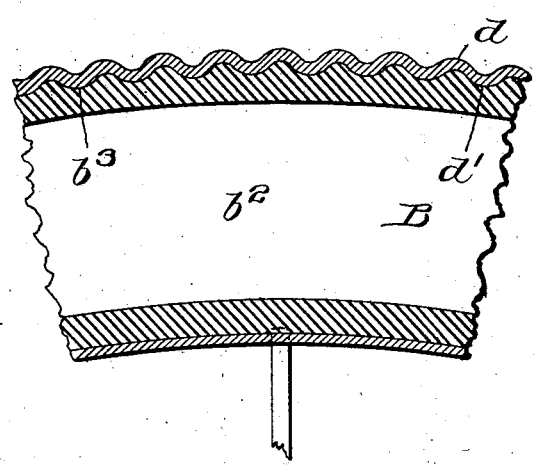

In the drawings illustrating my invention, Figure 1 is a lateral cross-section of the compressible tire-cushion and exterior metallic tire with an elevation of enough of a wheel-center to show its application thereto. Fig. 2 is a longitudinal section of the same.

Referring now to said drawings, the wheel-center is indicated at A, which may be of any usual form adapted to receive upon its periphery and to hold in position a modified form B of the usual and well-known inflated rubber tire with hollow interior $b^2$; but in the combination constituting my invention it is not employed as a tire, but as a cushion for an exterior steel band or tire proper, (indicated in section at C in Fig. 1, and in side elevation at Fig. 2.) To that end it is required to be constructed with a peripheral surface $b$, adapted to receive such tire, and which but for the exterior metallic band would constitute its tread. In the drawings it is shown as having a square and initially flat tread $b$, flat on the periphery, save for a radial groove $b'$, which is preferable, but not essential, and with which a rib $d$ or an equivalent and preferable series of short projecting ribs $c$, arranged at intervals on the inner face of the steel tire C, is adapted to register, the function of said parts in coaction being to hold the cushion and tire from lateral displacement.

The projecting rib $c$ on the inner face of the steel band or tire proper is preferably not continuous, but in the form of a series of short ribs arranged at intervals in the longitudinal plane of inner surface in order to avoid that stiffness of the rim or tire which would be increased by a single continuous rib.

The longitudinal peripheral groove $b'$ on the square-faced tread of the compressible cushion B is adapted to receive and register with such rib or ribs $c$ on the inner face of the tire-rim. Obviously such a groove will operate to guide the parts into true register when assembling them; but for the performance of the primary function of holding the said parts in register the groove $b'$ is not essential, as the rib or ribs $c$ will naturally sink into the tread-surface $b$, as the cushion B is for the purpose of my invention essentially compressible, and a very suitable form of it is a hollow rubber body adapted to be inflated by air, as is customary with the well-known hollow rubber pneumatic tires. The face or tread of the cushion C is also to be grooved, as at $b^3$, Fig. 2, with a series of shallow grooves or depressions to correspond with the under face of the tire-band C of said Fig. 2, as and for the purpose hereinafter described. The steel band C, constituting the tire proper, may be in the form shown in Fig. 2—that is to say, a steel band having a long-waved corrugated surface, both interiorly and exteriorly—that is to say, the alternating ribs or projections $d$ $d'$ thereof are on opposite sides of the central line of the tire. These ribs lie in a plane parallel with the axis of the wheel and in transverse direction to the length of the tire. Compressing such a tire upon such an inflated hollow cushion, as stated, the under ribs $d'$ of the corrugation will enter the corresponding groove $b^3$ on the tread of the cushion C and form a close register therewith; but even without such groove $b^3$ the ribs $d'$ will depress the rubber surface sufficiently to prevent all slipping or sliding movement of the tire thereon. The exterior long-waved ribs $d$ of the corrugation are designed to present additional frictional hold of the concrete wheel on the roadway, being particularly useful on smooth asphalt roadways.

To persons skilled in the art the advantages of my invention are obvious. The full resiliency of a pneumatic tire is retained, while the metallic exterior band or tire proper increases the durability of the pneumatic tire used as a cushion many fold. It obviates all punctures and it cheapens their cost, because as used in my invention they may be made lighter in weight and smaller in cross-section.

The long-waved corrugations in the exterior metal band or tire proper imparts a resiliency thereto which not only contributes to the resiliency of the tire and cushion as a concrete device, but is responsive to the resiliency of the rubber cushion-tire, and under all usual conditions operates in conjunction with it and does not lessen the extent of its resiliency, but, on the contrary, improves it, as the wave-lines of the exterior metal rim are always working in coöperation with the same outlines on the periphery of the rubber cushion when the latter is under air tension regardless of the amount of depression caused by ground contact when the vehicle is loaded. Moreover, an increased grip or traction-hold is obtained in ground contact due to the character of the external superficies of the metallic rim or tire proper. The latter is quite cheap in construction, most easily applied, and by the means described effectively held in position on the rubber cushion.

Having thus described my invention, what I claim as new, and desire to secure by Letters Patent, is—

1. The combination with a suitable wheel-center, of an inner compressible tire operating as a cushion, a continuous integral exterior metallic tire having interior and exterior undulating surfaces, and means between the coinciding elements adapted to maintain them fixedly in lateral register.

2. The combination with a suitable wheel-center, of a compound tire composed of an annular hollow tubing adapted to be inflated and having a flat tread parallel with the axis of the wheel, a continuous annular metallic rim or integral band having undulating interior and exterior surfaces, and means to maintain the tubing and rim in fixed lateral relation to each other.

In testimony whereof I have hereunto affixed my signature this 18th day of June, A. D. 1902.

HENRY P. FEISTER.

Witnesses:
GEO. W. REED,
H. T. FENTON.